July 10, 1928.

A. H. SHOEMAKER

WHEEL

Filed Sept. 13, 1926

1,676,874

INVENTOR
Alvin H. Shoemaker
BY
Fred C. Matheny
ATTORNEY

Patented July 10, 1928.

1,676,874

UNITED STATES PATENT OFFICE.

ALVIN H. SHOEMAKER, OF SEATTLE, WASHINGTON.

WHEEL.

Application filed September 13, 1926. Serial No. 135,073.

My invention relates to improvements in disc wheels and the objects of my invention are to provide a disc wheel of double disc construction that may be made of relatively light sheet metal formed and constructed in such a manner as to afford relatively great strength and at the same time to afford a flexibility which is desirable in wheels for motor vehicles which flexibility is not ordinarily found in disc wheels of this class.

Another object is to provide a disc wheel formed of two sheet metal discs, separated at the hub and having contact with each other just inside the rim and having their rim portions cupped for the reception of a separable rim member of substantially semicircular cross section which fits within said cupped portions and has its edges crimped over the edges of said cupper rim portions in such a manner as to afford inclined seating rings for the bead portions of a pneumatic tire of the form disclosed in my co-pending application, Serial No. 69,995, filed, Nov. 19, 1925, said rim member co-operating with a tire in forming an air cavity.

Another object is to provide a double disc wheel in which the discs are reinforced at the hub in a novel and efficient manner to render the hub portion of the wheel of equal strength with the remaining portions.

Other and more specific objects will be apparent from the following description taken in connection with the accompanying drawings.

In the drawings Figure 1 is a view in side elevation of a disc wheel constructed in accordance with my invention.

Like reference numerals designate like parts throughout the several views.

Figure 2:
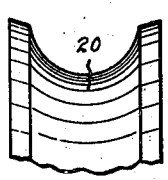
Fig. 2 is a fragmentary edge view of the same.
Figure 1:
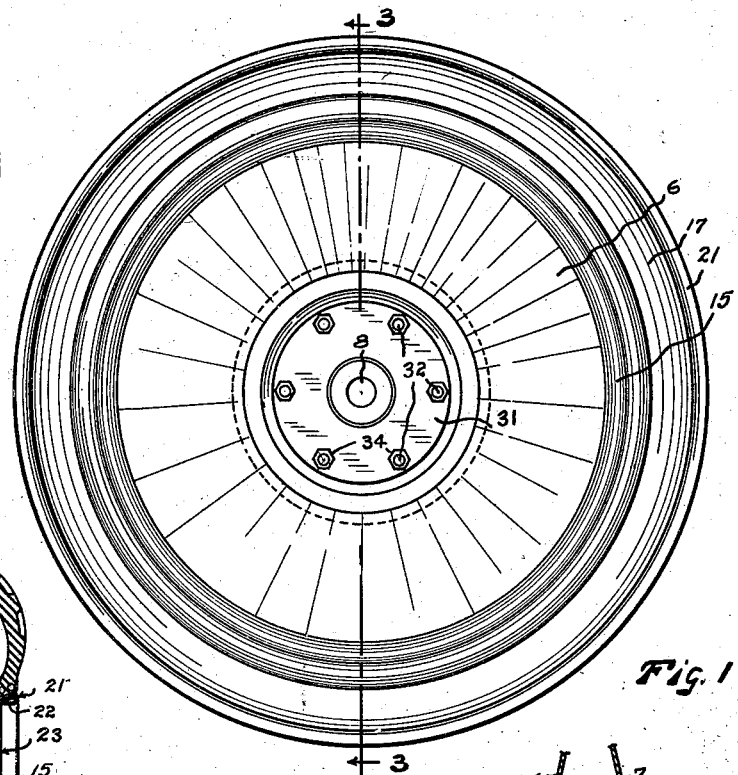

Referring to the drawings, the numerals 6 and 7 designate two discs of duplicate construction that are formed with centrally arranged openings adapted to fit over a hub 8. Those portions of the discs 6 and 7 adjacent the central openings are flat and normally disposed in planes that are perpendicular to the axis of the wheel for a short distance from the hub as indicated at 10. Said discs are then bent outwardly sharply as at 11 to widen the distance between the two discs of the wheel and said discs then extend straight outwardly and parallel for a short distance as at 12 and thence converge toward the periphery or rim of the wheel and are preferably in contact with each other around two annular contact rings 13 and 14 located on opposite sides of outwardly arched beads 15. Beyond the outer contact ring 14 the discs 6 and 7 bend sharply outward as at 16, are thence cupped to form curved rim receiving portions 17 of substantially quarter arcuate cross sectional shape and finally terminate in inclined flanges 18 that extend in a general sidewise direction at an angle that varies, preferably from ten to fifteen degrees, with respect to a tangential plane that is at right angles to the plane of the wheel.

The beads 15 give additional strength to the discs in the area just inwardly from the rim.

Extending around the peripheral portions of the discs 6 and 7 is a one piece rim member 20 of semicircular cross sectional shape having its side edges resting flatly on the inclined flanges 18 thence bent inwardly as at 21 toward the hub of the wheel and thence bent on around underneath the flanges 18 as at 22 and crimped or locked tightly against the arcuate portions 17 as shown at 23.

The rim member 20 is preferably made from a strip of sheet metal having its two ends welded or otherwise rigidly secured together to form a hoop. This hoop is then rolled to form the semicircular portion. After the hoop is thus formed the discs 6 and 7 are brought into place on opposite sides of the same and the edges of the rim member or hoop are rolled over and crimped tightly underneath the flanges 18 on the discs. The rim member thus serves to bind the two discs together at the periphery and greatly reinforces and strengthens the inclined flanges forming rigid conical elements for the reception of the bead portions 24 of a tire 25. The portions 21 constitute radial stiffeners at the outer edges of the inclined bead receiving members and the portions 22 constitute compression members that resist forces tending to bend the outer edges of the bead receiving elements toward the axis of the wheel. The rim member 20 rests upon and is supported by the quarter arcuate portions 17 of the discs throughout the greater portion of a semicircle thereby utilizing to the fullest possible extent the strength of both of said parts in forming the wheel rim. The tire 25 is of the semi-tire type in which a portion of the air is contained within the arcuate or recessed rim and the bead portions 24 of the tire rest upon the conical bead receiving portions of the rim and are forced outwardly thereon by internal air pressure.

Figure 3:
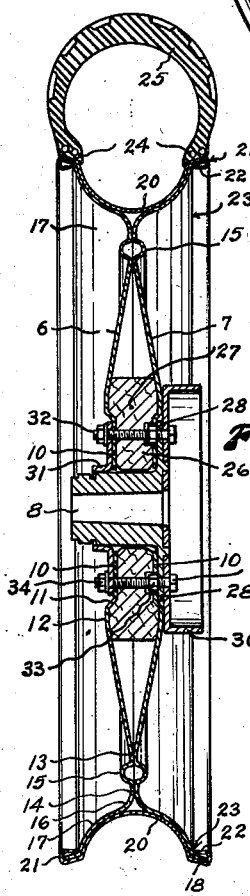
Fig. 3 is a sectional view substantially on broken line 3—3 of Fig. 1 with an additional showing of a tire on one part of the wheel.
Figure 4:
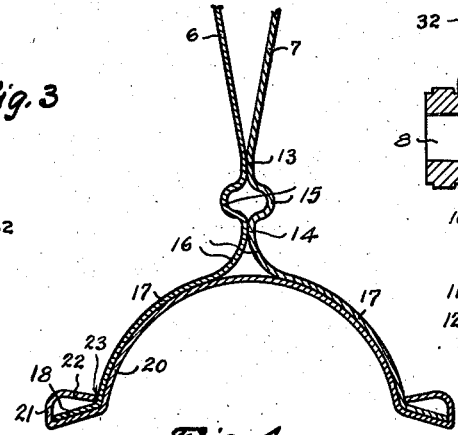
Fig. 4 is a fragmentary sectional view on a large scale of the rim portion of this wheel.
Figure 5:
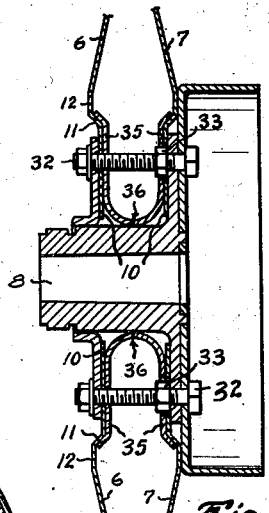
Fig. 5 is a fragmentary sectional view showing a slightly different form of hub reinforcing means from that shown in Fig. 3.

The hub of the wheel may be formed either as shown in Fig. 3 or Fig. 5, the disclosure of Fig. 3 being preferable where reinforcing parts of wood or light metal are used and the disclosure of Fig. 5 being preferable where the reinforcing parts are of iron or steel.

In Fig. 3 a reinforcing block or disc 26 preferably of hard wood is used, said reinforcing block being enlarged as at 27 toward its periphery to fit within the enlarged or widened portions formed by the parts 11 and 12 of the discs. The hub 8 is provided at the inside with an integral flange 28 adapted to fit against, and be secured to the end of a brake drum 30 and a separable disc like flange member 31 is provided at the outer side. Bolts 32 extend through the brake drum 30, flange 28, disc 7, block 26, disc 6, and flange member 31 in the order named to rigidly secure the several parts together in assembled relation. Nuts 33 are preferably screwed onto said bolts 32 against the flange 28 and fit into enlargements in the holes through the plate 7 and block 26 to permit the wheel to be readily demounted from the brake drum 30 and hub 8 by first removing the nuts 34 on the outer ends of said bolts.

In Fig. 5, I show the hub reinforcing member as formed of two metal plates 35 of substantially duplicate construction that abut together around the hub as at 36. All of the remaining parts in Fig. 5, may be identical with the corresponding parts shown in Fig. 3.

The block 26 or plates 35 form very efficient hub reinforcing means and co-operate with the discs 6 and 7 and with the several hub parts to center the wheel and to form a very rigid and substantial hub structure for said wheel.

The holding means at the periphery and at the hub of the wheel tends to flex the plates 6 and 7 and causes said plates to bear firmly against each other at the rings of contact 13 and 14.

The foregoing description and accompanying drawings clearly disclose a preferred embodiment of my invention but it will be understood that this disclosure is merely illustrative and that such changes in construction may be resorted to as are within the scope and spirit of the following claims:

I claim:—

1. In a disc wheel, two sheet metal discs spaced apart at the hub and converging toward the periphery and having circumferential recessed portions affording an annular groove, and inclined flanges formed at the sides of said groove for the reception of tire beads.

2. In a disc wheel, two discs spaced apart at the hub and converging to annular contact near the periphery, thence bent to form recessed portions of substantially quarter arcuate cross sectional shape and terminating in inclined flanges located at the sides of said recessed portions and forming conical tire bead receiving means.

3. In a double disc wheel, two discs spaced apart at the hub and converging to annular contact near their periphery thence having recessed portions of substantially quarter circular cross sectional shape which terminate in inclined flanges that project in a general sidewise direction, and a rim portion of substantially semi-circular cross sectional shape fitting within the quarter circular portions of said discs and having its edges bent over said inclined side flanges.

4. In a double disc wheel, two discs spaced apart at the hub and converging to annular contact near their periphery thence having recessed portions of substantially quarter circular cross sectional shape which terminate in inclined flanges that project in a general sidewise direction, and a rim portion of substantially semi-circular cross sectional shape fitting within the quarter circular portions of said discs and having its edges bent over said inclined side flanges, the extremities of said rim portion being crimped tightly against said quarter circular portions at the location of the angle formed by their intersection with said inclined side flanges.

5. In a double disc wheel, two discs spaced apart at the hub and converging to annular contact near their periphery thence having recessed portions of substantially quarter circular cross sectional shape which terminate in inclined flanges that project in a general sidewise direction, and a rim portion of substantially semi-circular cross sectional shape fitting within the quarter circular portions of said discs, the edges of said rim portion resting on said inclined side flanges and being bent inwardly over the edges of said inclined flanges and extending under said inclined flanges in spaced relation therefrom, the extremities of said rim portion being firmly crimped into the angles formed at the intersection of said quarter circular portions and said inclined flanges.

6. In a double disc wheel, two discs spaced apart at the hub and converging to annular contact near their periphery thence having recessed portions of substantially quarter circular cross sectional shape which terminate in inclined flanges that project in a general sidewise direction, and a rim portion of substantially semi-circular cross sectional shape fitting within the quarter circular portions of said discs, and resting on said quarter circular portions throughout the greater part of their width, the edges of said rim portion resting on and being crimped underneath said inclined side flanges to form tire bead receiving cones and to secure the peripheries of said discs together.

7. In a double disc wheel, two sheet metal discs spaced apart at the hub and converging together near their peripheries and provided where they come together with outwardly directed integral annular reinforcing beads leaving a ring of contact just inside of said beads and another ring of contact just outside of said beads and rim means on said discs outwardly from said beads.

8. A disc wheel embodying two sheet metal discs having parallel portions near the hub and thence diverging at a short distance from the hub to afford a space of greater width therebetween, and spacing means arranged to fit between said parallel hub portions and having a widened circumferential part arranged to enter said space of greater width between said discs.

9. A disc wheel embodying two sheet metal discs having parallel portions near the hub and thence diverging at a short distance from the hub to afford a space of greater width therebetween and spacing arranged to fit between said parallel hub portions and having a widened circumferential part arranged to enter said space of greater width between said discs, said spacing means comprising two disc like metal plates having outwardly inclined peripheral portions and inwardly curved hub portions that are arranged to abut against each other.

The foregoing specification signed at Seattle, Washington, this 7th day of Sept., 1926.

ALVIN H. SHOEMAKER.